United States Patent [19]

Kearney

[11] 4,399,346
[45] Aug. 16, 1983

[54] OPTOELECTRONIC WELD TRAVEL SPEED SENSOR

[76] Inventor: Frank W. Kearney, 1011 W. White St., Champaign, Ill. 61820

[21] Appl. No.: 268,219

[22] Filed: May 29, 1981

[51] Int. Cl.³ .............................................. B23K 9/10
[52] U.S. Cl. .......................... 219/130.01; 219/124.34; 219/130.21
[58] Field of Search .................... 219/130.01, 130.21, 219/137 PS, 124.34

[56] References Cited

U.S. PATENT DOCUMENTS

| | | | |
|---|---|---|---|
| 3,236,997 | 2/1966 | Johnson et al. | 219/124.03 |
| 3,262,006 | 7/1966 | Sciaky et al. | 314/63 |
| 3,370,151 | 2/1968 | Normando | 219/130.01 |
| 3,497,668 | 2/1970 | Hirsch | 358/242 |
| 3,526,748 | 9/1970 | Rienks | 219/130.01 |
| 3,567,899 | 3/1971 | Iceland et al. | 219/124.34 |
| 3,602,687 | 8/1971 | Pollock | 219/137.7 |
| 3,838,727 | 10/1974 | Levi et al. | 164/453 |
| 4,093,844 | 12/1978 | Fellure et al. | 219/124.02 |
| 4,273,987 | 6/1981 | Nomura et al. | 219/124.34 |

FOREIGN PATENT DOCUMENTS 2045473 10/1980 United Kingdom ........... 219/130.21

*Primary Examiner*—C. C. Shaw
*Attorney, Agent, or Firm*—Darrell E. Hollis

[57] ABSTRACT

The sensor of the present invention is adapted for use on the electrode holder of a manual arc welding apparatus. The sensor comprises a first optical fiber having a receiving end disposed in a first zone adjacent to the weld puddle produced by the arc welder so as to receive radiation indicative of the weld temperature in that zone, and a second optical fiber having a receiving end disposed in a second zone rearward of the first zone so as to receive radiation indicative of the weld temperature in the second zone. Each optical fiber transmits received radiation to a respective photosensor, which produces an analog electrical signal in accordance with the level of the radiation. These two signals are processed and compared continuously to produce an output signal indicative of the travel speed of the weld bead produced by the manual arc welding apparatus.

15 Claims, 4 Drawing Figures

OPTOELECTRONIC WELD TRAVEL SPEED SENSOR

STATEMENT OF GOVERNMENT INTEREST

The invention described and claimed herein may be manufactured and used by or for the Government of the United States of America for governmental purposes without the payment of royalties thereon or therefor.

BACKGROUND OF THE INVENTION

1. Field of the Invention

This invention relates generally to systems for monitoring the quality of a weld bead, and more particularly to systems capable of monitoring the speed at which the weld bead is produced by a welding apparatus.

2. Discussion of the Related Art

During the welding process, changes in various welding parameters, such as the travel speed of the welding bead, can occur without the knowledge of the operator. Changes in travel speed can directly result in weld defects, as well as cause changes in weld heat input, which can produce additional weld defects.

One travel speed related defect in a weld is an undercut: a groove melted into the base plate at the toe of the weld, which is caused primarily by a travel speed that is too fast with respect to the welding current employed.

Another travel speed related defect is a slag inclusion: entrapment of an oxide or other non-metallic material under the weld bead. A major source of slag is the coating on stick electrodes, and the amount of slag inclusion is related to the heat input to the weld.

Incomplete fusion—the failure of adjacent layers of the weld metal or weld baseplate to fuse—is another travel speed related defect. Incomplete fusion may result when adjacent metal is not heated to the melting point because of insufficient heat input to the weld.

The cost of locating and repairing weld defects can be a major construction cost. For example, weld inspection can constitute 25-40% of weld fabrication costs. Consequently, it would be desirable to have a real-time weld quality monitor system and method which could monitor selected welding parameters and provide an alarm or cause interruption in welding when defects are detected, thereby eliminating costly rework of defective welds.

Further, the cooling cycle after a weld pass determines the microstructure of the weld metal in the heat-affected zone. With fast cooling rates, some steels become very hard because of a martensitic transformation. If cooling is sufficiently slow, the metal may be more ductile and the structure ferritic and pearlitic. The type of steel generally determines which of these structures is desired. For example, the pearlitic structure is desirable for low carbon and low alloy steels, whereas the martensitic structure is preferred for high strength quenched and tempered steel.

Accordingly, control of the cooling rate is essential to prevent undesirable microstructure in the weld and heat effected baseplates. This control of the weld cooling rate can be obtained through control of the heat input to the weld.

Systems and methods have been suggested for monitoring and controlling certain welding parameters.

For example, U.S. Pat. No. 3,236,997 to Johnson et al. shows a system for controlling the length of a welding arc. A photosensitive transducer, such as a photodiode, is positioned to sense the illumination emitted by the arc of an arc welder between the electrode and the workpiece. A sensing system includes a tubular light pipe and a mirrored surface to project a beam of detectible illumination from the arc through the light pipe to the photodiode sensor.

U.S. Pat. No. 3,262,006 to Sciaky et al. shows a welding control system including a light sensitive probe which incorporates an arrangement using fiber optics to transmit the illumination from the area adjacent the weld to a sensor or phototransducer which is disposed at a remote location.

U.S. Pat. No. 3,370,151 to Normando shows a control system using radiant energy detector scanning. The Normando apparatus generates a train of electrical pulses indicative of successive temperature profiles along lines transverse to a weld bead at a point at a fixed distance from the welding electrode. The Normando apparatus uses a detector which is sensitive mainly to infrared radiation and to a mixture of infrared and visible red radiation. The output of the Normando system can be used for any of various purposes, for example, to vary a selected parameter of the welding machines such as speed of electrode travel along the seam, or to control the welding current.

Other patents which may be considered to be of interest include: U.S. Pat. No. 3,497,668 to Hirsch; U.S. Pat. No. 3,567,889 to Iceland et al.; U.S. Pat. No. 3,602,687 to Pollock; U.S. Pat. No. 3,838,727 to Levi et al.; and U.S. Pat. No. 4,093,844 to Fellure et al.

OBJECTS OF THE INVENTION

One object of the present invention is to provide a sensor system and method for accurately indicating the travel speed of a welding electrode without physically contacting the surface being welded.

A further object of the present invention is to provide a weld speed sensor and method which is capable of displaying a real-time indication of the weld speed of an electrode in order to afford an operator the opportunity to correct for potential weld defects on a continuous basis during the welding operation.

Another object of the present invention is to measure the weld speed optically.

A further object of the present invention is to provide a weld travel speed sensor and method which can be attached easily to existing manual welding systems without requiring complex procedures or modifications.

Yet another object of the present invention is to provide a weld travel speed sensor which is relatively economical to manufacture, and effective and highly durable in use in the high temperature environment associated with a welding apparatus.

SUMMARY OF THE INVENTION

In accordance with the above objects, the weld travel speed sensor of the present invention comprises a first sensor for receiving and measuring radiation emitted from a weld bead in a first measurement zone, and a second sensor for receiving and measuring radiation emitted from the weld bead in a second measurement zone, where the second measurement zone is spaced rearwardly from the first measurement zone along the weld bead. The signals from each of the two sensors, which signals are indicative of the temperature of the weld bead in the respective measurement zones, are provided to a comparator which produces an output signal which is indicative of weld speed.

Each of the sensors of the present invention includes a fiber optic element having a first end which terminates adjacent the weld bead in one of the respective measurement zones, and a second end operatively associated with a separate photoelectric transducer; each photoelectric transducer converts the radiation transmitted through the associated fiber optic element into a corresponding electrical signal.

The wavelength of the radiation transmitted and measured by the photoelectric transducer is confined to a predetermined frequency range, for example, from 700–1,050 nanometers. This frequency range can be produced either by insertion of an optical filter in the path of the radiant energy on either side of the associated fiber optic element, or by choosing a photoelectric transducer having the desired frequency response.

The method of the present invention essentially comprises the steps of: optically measuring the temperature of a weld bead in a first zone to produce a first signal in accordance therewith; optically measuring the temperature of the same weld bead in a second zone spaced from the first zone along the weld bead so as to produce a second signal in accordance therewith; and producing an output signal in response to said first and second signals.

Further in accordance with the method of the present invention, the output signal is adjusted by imperically derived data to provide an accurate representation of the speed at which the arc forming the weld bead progresses along the work surface.

A further aspect of the method of the present invention is encompassed in the step of filtering the energy received from the weld bead so as to allow energy to be measured only in a preselected frequency range.

BRIEF DESCRIPTION OF THE DRAWINGS

The above and additional objects and advantages of the present invention will become more readily apparent as the invention becomes more fully understood when described with reference to the accompanying drawings, wherein.

DESCRIPTION OF THE PREFERRED EMBODIMENT

Figure 1:
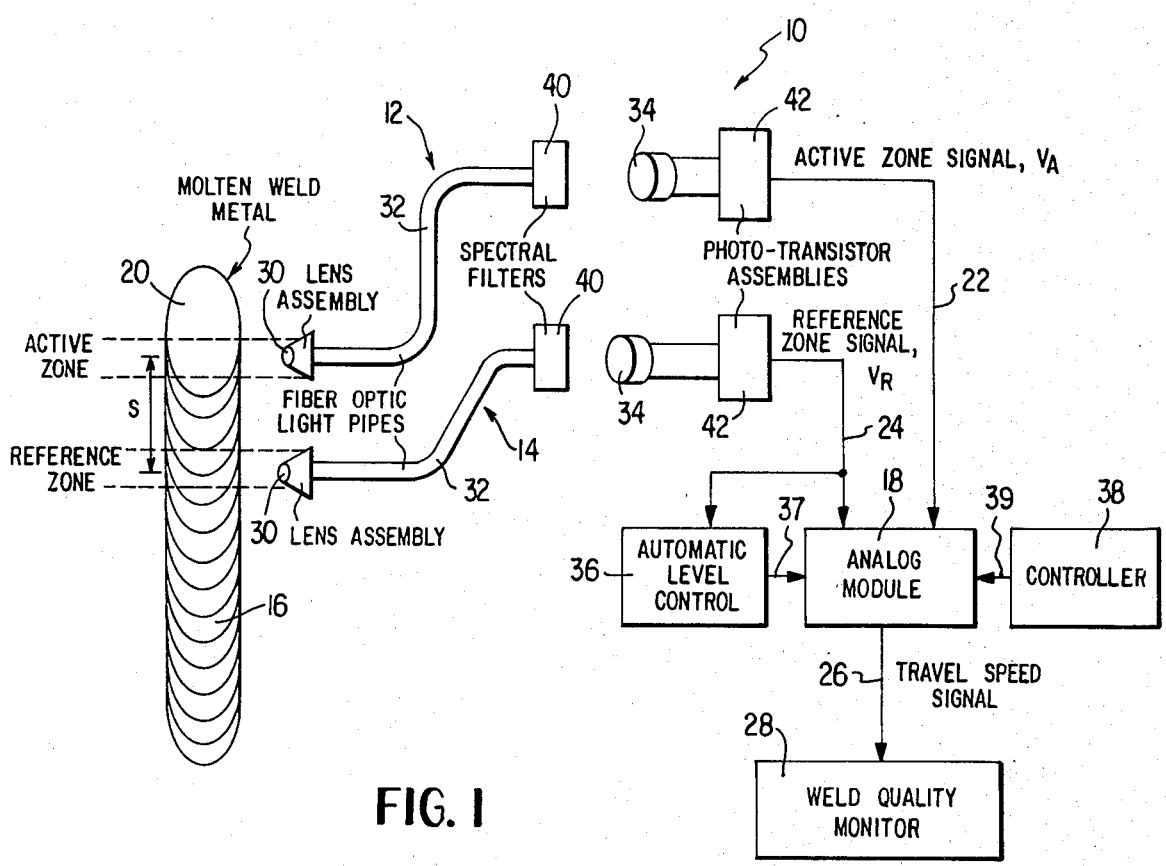
FIG. 1 shows a schematic representation of the weld speed sensing system of the present invention.

Referring now to FIG. 1, the speed sensing system of the present invention is designated generally by reference numeral 10. The system comprises two channels 12 and 14 which are identical in construction and are adapted to provide an indication of the temperature of the weld bead 16 at two points spaced by a predetermined distance S along the weld bead. The system parameters are adjusted according to known, imperically derived cooling rate factors associated with specific base plate materials, thicknesses, etc. This having been done, the signals derived by the channels 12 and 14 are subtracted in analog module 18. The difference signal derived in module 18 is proportional to the speed at which the welding electrode advances.

The first channel 12 senses the temperature of the weld bead in the vicinity of the weld nugget or puddle 20. This area of the weld bead is referred to as the active zone. A signal is provided on line 22 and is referred to as the first or active zone signal $V_a$. Signal $V_a$ is indicative of the temperature of the molten metal in the active zone.

In like manner, the second channel 14 produces on a line 24 a second or reference zone signal $V_r$ which is indicative of the temperature of the weld bead in the reference zone which is spaced a distance S behind the active zone.

For a particular weld bead travel speed, the difference between the active zone signal $V_a$ and the reference zone signal $V_r$ will be constant. A change in the weld bead travel speed causes a corresponding change in the reference zone signal. For example, at a substantially constant cooling rate, a higher weld bead travel speed causes the temperature in the reference zone region (which is S inches behind the arc) to be higher because of the shorter travel time for the arc to move a given distance: conversely, the reference zone region has a lower temperature for a slower weld bead travel speed. These mathematical relationships, which it should be understood are approximate and accurate only to the error limits of the total weld apparatus including the system of the present invention, can be expressed by the following three equations:

$$(V_a - V_r) = E \text{ for optimum travel speed} \tag{1}$$

$$(V_a - V_r) < E \text{ for faster travel speed} \tag{2}$$

$$(V_a - V_r) > E \text{ for slower travel speed} \tag{3}$$

wherein E is defined as the optimum travel speed and is established according to the welding characteristics that are desired.

The active zone signal and the reference zone signal are conditioned and scaled to produce an output or travel speed signal provided on a line 26 to a weld quality monitor 28.

Figure 3:
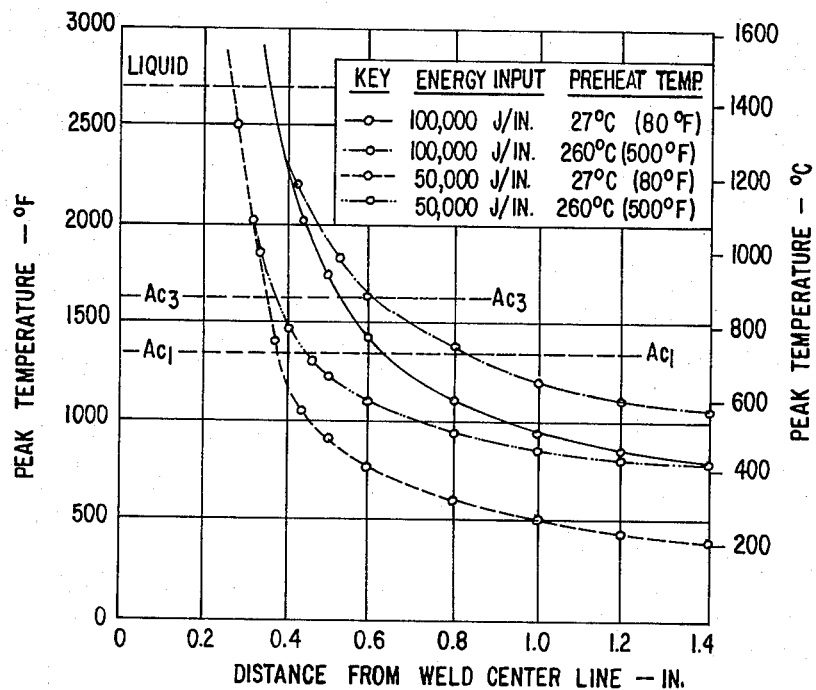
FIG. 3 plots for specific heat inputs in Joules per inch the peak temperature in degrees Farenheit of the resultant weld bead on the vertical axis with respect to the distance from the weld bead center line in inches on the horizontal axis.
Figure 4:
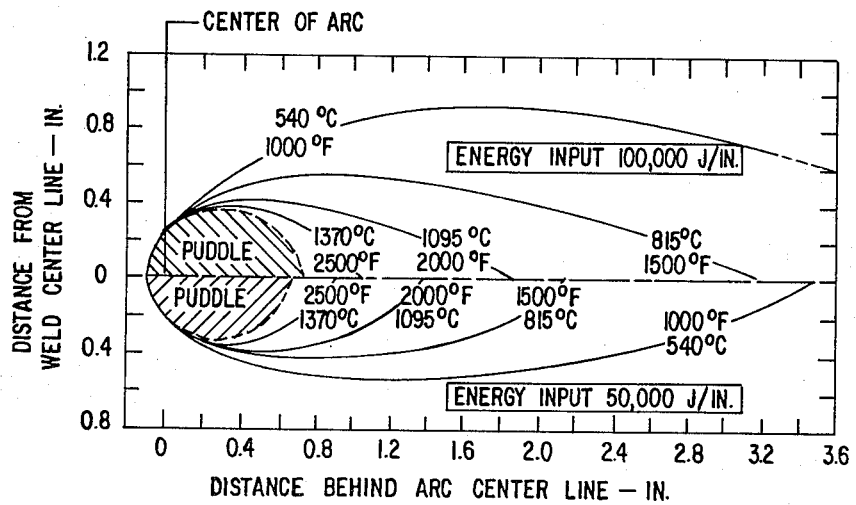
FIG. 4 plots the bead temperature distribution in degrees Fahrenheit as shown by isothermal lines with respect to the lateral and rearward distances in inches from the weld puddle for two specific heat inputs.

With reference to FIG. 3, it will be understood that the measured peak temperature of the weld bead varies as a function of the distance the temperature measurement is taken laterally from the weld bead center line. With reference to FIG. 4, it also can be seen that the measured peak temperature of the weld bead varies as a function of the distance at which the measurement is taken to the rear of the weld puddle. As a consequence, care must be taken to insure that the temperature measurements taken by channels 12 and 14 are accurate representations of the relative weld bead temperatures between the active zone and reference zone. This most readily is accomplished by using lens assemblies 30, shown in FIG. 1, to focus radiation from across the entire weld bead width, thus providing a measurement indicative of the average weld bead temperature in either the active zone or the reference zone.

Further with reference to FIG. 4, it will be seen that the temperature difference between any two points along the weld bead is actually a function of heat input generated by the welding apparatus. Heat input is measured in terms of energy in Joules per unit distance in inches. Accordingly, a specific temperature difference measured by channels 12 and 14 can be indicative of either a change in power produced by the welding apparatus or a change in speed.

The heat input is related to power and travel speed according to the following mathematical equation:

$$HI=(V)(A)/v \qquad (4)$$

wherein
HI = heat input in Joules per inch;
V = voltage in volts;
I = current in amperes; and
v = travel speed in inches per minute.

It will be understood from the above that the welding voltage and current should be held constant in order for the present invention to provide utmost accuracy in measuring welding speed. When these parameters are held constant, the system can be calibrated for a desired heat input.

Referring again to FIG. 1, it is seen that each of the channels 12, 14 comprises a lens assembly 30, a fiber optic light pipe 32, a spectral filter 40, a photoelectric transducer 34, and a phototransistor assembly 42. Each lens assembly 30 focuses infrared radiation from a preselected associated weld bead zone to a first end of a fiber optic light pipe 32 to provide a temperature measurement across the weld bead width as discussed above. Each fiber optic light pipe 32, for example, can comprise a plurality of individual optic elements; each element can have a diameter of approximately 0.04 inches and be fabricated to exhibit a transmission having the frequency range of 0.4 nanometers to 1.9 nanometers. Each fiber optic pipe 32 focuses effectively the radiation transmitted through it onto the detector of a photoelectric transducer 34. A suitable form for photoelectric transducer 34 is phototransistor such as a type TIL-63 of conventional design. Each photoelectric transducer 34 generates an electrical signal in accordance with the radiation provided to its detector. The electrical signal from each photoelectric transducer is provided to a phototransistor assembly 42 of conventional design. Each phototransistor assembly 42 conditions or amplifies the electrical signal provided to it and supplies it to an output. Specifically, the phototransistor assembly 42 for channel 12 provides the active zone signal $V_a$ at its output 40 a line 22, and the phototransistor assembly 42 for channel 14 provides the reference zone signal $V_r$ at its output to a line 24.

An analysis of metallurgical phase diagrams associated with weld nugget areas suggests that a frequency spectrum of approximately 700-1,500 nanometers would be optimum for a weld monitoring system. Accordingly, the radiation frequency from weld bead 16 must be limited to that range. Two methods of partitioning the weld spectrum can readily be implemented. The first comprises selection of photosensors such as phototransistors 34 having a spectral response only in the sections of the spectrum to be measured. However, greater flexibility has been found to be obtained by incorporating spectral filters 40 in the system. In use, a Wratten type 89B filter was selected for use with the aforementioned type TIL-63 phototransistors.

The active zone signal $V_a$ on line 22 is supplied to a first input and the reference zone signal $V_r$ on line 24 is supplied to a second input of an analog module 18 of conventional design. Analog module 18 subtracts the active zone signal $V_a$ from the reference zone signal $V_r$ to produce an output or travel speed signal provided on a line 26.

A level control circuit 36 of conventional design is supplied with the reference zone signal $V_r$ from line 24 and generates an adjustment signal supplied via a line 37 to the analog module 18. The adjustment signal causes the sensitivity of the first and second inputs of analog module 18 to be adjusted so that analog module 18 will not be overloaded.

In addition, controller 38 of conventional design provides a control signal via a line 39 to analog module 18 which acts to control the furnishing of operating power to analog module 18.

The output or travel speed signal on line 26 can be used as a speed control input signal to an automatic welding system (not shown), or as an input signal to a weld quality monitor 28, as shown in FIG. 1. The weld quality monitor 28 can be of any suitable type that provides the desired output information in accordance with the travel speed signal. For example, weld quality monitor 28 can comprise a comparator and display circuitry of conventional design for producing a visual display when the level of travel speed signal on line 26 is below or above preselected limits, thus indicating an overspeed or an underspeed condition, respectively.

Figure 2:
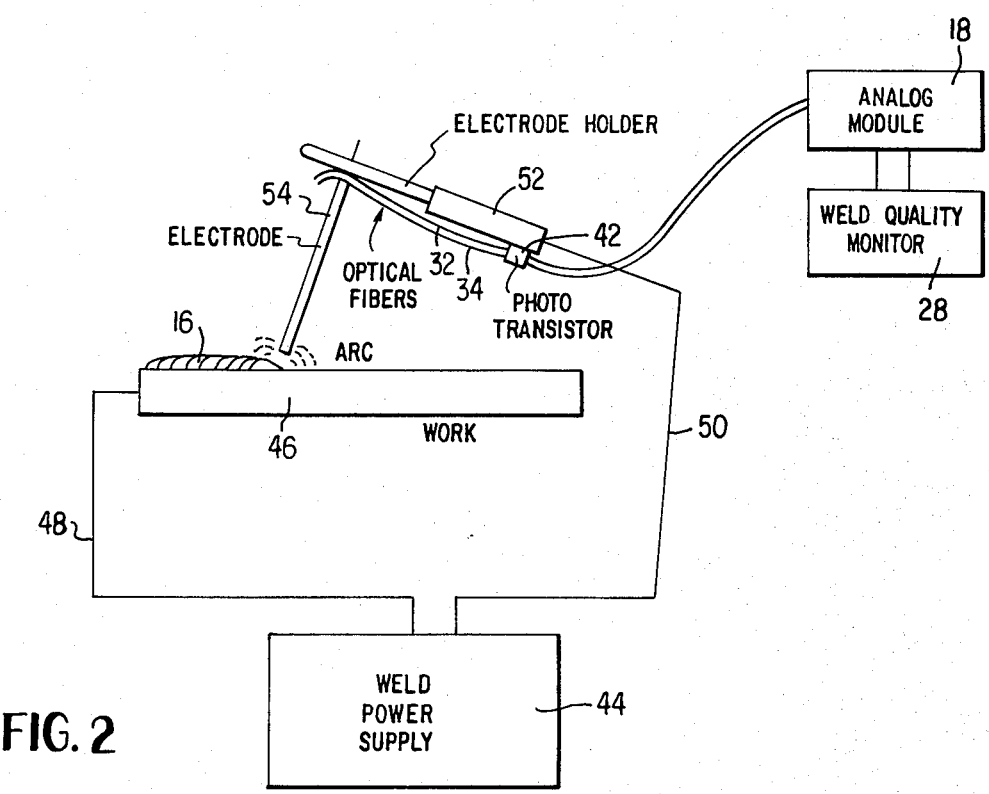
FIG. 2 schematically shows the manner in which the optical fibers of the present invention are associated with an electrode holder.

The speed sensor system of the present invention is primarily intended for use on a manual welding apparatus. FIG. 2 shows a representative application of the present invention. As seen in FIG. 2, the system can be connected easily to a manual welder apparatus without interfering with any of the components of such an apparatus. The analog module 18 and weld quality monitor 28 in this embodiment are separate units and are not connected to weld power supply 44 of the welding apparatus. In conventional fashion, the weld power supply 44 is attached to a workpiece 46 through a ground line 48, and via a line 50 and a holder 52 to an electrode 54. A weld bead 16 is produced by the arc created by the completion of the electric circuit from electrode 54 and the workpiece 46. The speed sensor of the present invention and the manual welding apparatus, as shown in the embodiment of FIG. 2, are connected physically at the fiber optic light pipes 32, which are attached by suitable mounting brackets to the electrode holder 52 so as to secure them within preselected distances with respect to the weld bead 16. In addition, each phototransistor 34 and associated phototransistor 42 is mounted to the electrode holder 52 in suitable manner.

It should be understood that the speed sensor system and method of the present invention can be used with any type of welding apparatus, such as consumable electrode or nonconsumable electrode arc welding apparatus; gas shielded and non-shielded apparatus; and gas welding systems employing selected gases such as oxy-acetyline.

Obviously, numerous modifications and variations of the present invention are possible in light of the above teachings. It is therefore to be understood that within the scope of the appended claims the invention may be practiced otherwise than as specifically described herein.

I claim as my invention:
1. A weld speed monitoring system adapted to be utilized with a welding apparatus producing a continuous weld bead along a surface, which system comprises:

first sensor means for receiving radiation emitted from said weld bead in a first zone and for producing a first signal indicative of the level of the radiation emitted from said first zone;

second sensor means for receiving radiation emitted from said weld bead in a second zone and for producing a second signal indicative of the level of said radiation emitted from said second zone, wherein said second zone is disposed in spaced relation to said first zone along said weld bead; and comparator means for producing an output signal in accordance with said first and second signals.

2. The system as defined in claim 1 wherein said first sensor means comprises a first fiber optic member having a first end terminating in a position adjacent said first zone.

3. The system as defined in claim 2 wherein said second sensor means comprises a second fiber optic member having a first end terminating in a position adjacent said second zone.

4. The system as defined in claim 2, wherein said first fiber optic element has a second end, and wherein said first sensor means comprises a first photoelectric transducer means responsive to said second end for producing said first signal in response to the radiation transmitted through said first fiber optic element.

5. The system as defined in claim 4 wherein said second fiber optic element has a second end, and wherein said second sensor means comprises second photoelectric transducer means responsive to said second end of said second fiber optic element for producing said second signal in response to the radiation transmitted to said second fiber optic element.

6. The system as defined in claim 3, and further comprising filter means associated with each of said first and second sensor means for limiting the spectral content of the radiation measured by each of said first and second sensor means to a predetermined wavelength range.

7. The system as defined in claim 6, wherein said filter means comprises an optical filter.

8. The system as defined in claim 6, wherein said filter means comprises a photoelectric sensor responsive to said predetermined wavelength range.

9. The system as defined in claim 1 wherein said comparator means output signal from said comparator means is substantially proportional to the difference between said first and second signals.

10. The system as defined in claim 1, wherein said welding apparatus comprises an electric arc welder.

11. The system as defined in claim 3, wherein further comprising first and second lens assemblies associated with said first and second fiber optic members, respectively, for focusing radiation thereon.

12. A method for measuring the speed at which a weld puddle progresses along a work surface to produce a weld bead, comprising the steps of:

(a) optically measuring the temperature of said weld bead at a first position with respect to said weld puddle to produce a first signal in accordance therewith;

(b) optically measuring the temperature of said weld bead in a second position with respect to said weld puddle to produce a second signal in accordance therewith; and (c) producing an output signal in response to said first and second signals.

13. The method as defined in claim 12, wherein step (c) comprises the step of determining the difference between said first and second signals.

14. The method as defined in claim 13, wherein steps (a) and (b) comprise the steps of electrically measuring radiation emitted from said weld bead.

15. The invention as defined in claim 14, wherein steps (a) and (b) further comprise the steps of optically filtering said radiation.

* * * * *